US012784328B2

(12) United States Patent
Michimura et al.

(10) Patent No.: US 12,784,328 B2
(45) Date of Patent: Nov. 3, 2026

(54) INFORMATION PROCESSING SYSTEM, METHOD, AND NON-TRANSITORY COMPUTER READABLE MEDIUM FOR RENDERING 2D IMAGES OF 3D SHAPE TO SHOW EDITS

(71) Applicant: FUJIFILM Business Innovation Corp., Tokyo (JP)

(72) Inventors: Tadao Michimura, Kanagawa (JP); Yasuyuki Furukawa, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/183,222

(22) Filed: Mar. 14, 2023

(65) Prior Publication Data

US 2024/0062458 A1 Feb. 22, 2024

(30) Foreign Application Priority Data

Aug. 19, 2022 (JP) ................................ 2022-131192

(51) Int. Cl.
*G06T 15/20* (2011.01)
*G06F 3/04815* (2022.01)
*G06F 3/04842* (2022.01)

(52) U.S. Cl.
CPC .......... *G06T 15/20* (2013.01); *G06F 3/04815* (2013.01); *G06F 3/04842* (2013.01)

(58) Field of Classification Search
None
See application file for complete search history.

(56) References Cited

U.S. PATENT DOCUMENTS 5,422,702 A 6/1995 Yasukawa
5,630,034 A 5/1997 Oikawa et al.
10,184,606 B2 1/2019 Nokuo et al.
2014/0267247 A1* 9/2014 Chen ...................... G06T 15/20 345/420
2018/0017204 A1 1/2018 Nokuo et al.
2020/0151286 A1* 5/2020 Willis .................... G06T 17/20

FOREIGN PATENT DOCUMENTS

JP H06-067257 A 3/1994
JP H07-282293 A 10/1995
JP H08-031474 A 2/1996
JP H09-204532 A 8/1997
JP 2007-158282 A 6/2007
JP 2008-309671 A 12/2008
JP 2017-107476 A 6/2017
JP 2018-010117 A 1/2018
JP 2019-207450 A 12/2019

OTHER PUBLICATIONS

Mar. 10, 2026 Office Action issued in Japanese Patent Application No. 2022-131192.

* cited by examiner

*Primary Examiner* — Nicholas R Wilson
(74) *Attorney, Agent, or Firm* — Oliff PLC

(57) ABSTRACT

An information processing system includes one or plural processors configured to: identify at least one revised part changed between before and after editing of three-dimensional shape data representing a three-dimensional shape; and control a specific image that is based on the three-dimensional shape data and is obtained by viewing the three-dimensional shape from a specific viewpoint at which a feature value of the at least one revised part satisfies a predetermined condition to be displayed.

20 Claims, 16 Drawing Sheets

INFORMATION PROCESSING SYSTEM, METHOD, AND NON-TRANSITORY COMPUTER READABLE MEDIUM FOR RENDERING 2D IMAGES OF 3D SHAPE TO SHOW EDITS

CROSS-REFERENCE TO RELATED APPLICATIONS

This application is based on and claims priority under 35 USC 119 from Japanese Patent Application No. 2022-131192 filed Aug. 19, 2022.

BACKGROUND

(i) Technical Field

The present disclosure relates to an information processing system, an information processing method, and a non-transitory computer readable medium.

(ii) Related Art

In Japanese Unexamined Patent Application Publication No. 7-282293, a three-dimensional image generating method including a step of determining, in input volume data, voxel data having a value exceeding a threshold value and voxel data categorized as a set display type as display target candidate voxel data, is described.

In Japanese Unexamined Patent Application Publication No. 2019-207450, a volume rendering device including means for, by referring to a color map in which a color component value and an opacity are defined in association with a signal value, replacing signal values of voxels arranged three-dimensionally in association with pixels of a plurality of tomographic images with opacities and creating an opacity voxel image in which an opacity is defined as a voxel value, is described.

In Japanese Unexamined Patent Application Publication No. 9-204532, an image recognizing method for inputting CAD data, which is design information about a subject, to a processing device and determining the contour of an object part that is present in a tomographic image by processing only image data in the vicinity of the contour of the object part at the time of design that is obtained from the CAD data, is described.

In Japanese Unexamined Patent Application Publication No. 2008-309671, an object recognizing method including a step of integrating a plurality of pieces of measurement data that are measured at a plurality of measurement positions and a plurality of error distributions and a step of rotating and translating a measured object expressed by model data with respect to the integrated measurement data and error distribution and performing alignment in such a manner that an evaluation value related to a distance between the measurement data and an element configuring the model data is minimized, is described.

SUMMARY

When three-dimensional shape data having a three-dimensional shape is edited, a revised part that is changed between before and after the editing may be generated. In such a case, if a configuration in which an image obtained by viewing the three-dimensional shape from a predetermined viewpoint is displayed is adopted, an image obtained by viewing the three-dimensional shape from a viewpoint corresponding to the revised part is not able to be displayed. Thus, for example, an image that allows the revised part to be easily confirmed is not able to be displayed.

Aspects of non-limiting embodiments of the present disclosure relate to displaying an image obtained by viewing a three-dimensional shape from a viewpoint corresponding to a revised part changed between before and after editing of three-dimensional shape data representing the three-dimensional shape.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including one or a plurality of processors configured to: identify at least one revised part changed between before and after editing of three-dimensional shape data representing a three-dimensional shape; and control a specific image that is based on the three-dimensional shape data and is obtained by viewing the three-dimensional shape from a specific viewpoint at which a feature value of the at least one revised part satisfies a predetermined condition to be displayed.

BRIEF DESCRIPTION OF THE DRAWINGS

Exemplary embodiments of the present disclosure will be described in detail based on the following figures, wherein.

DETAILED DESCRIPTION

Figure 1:
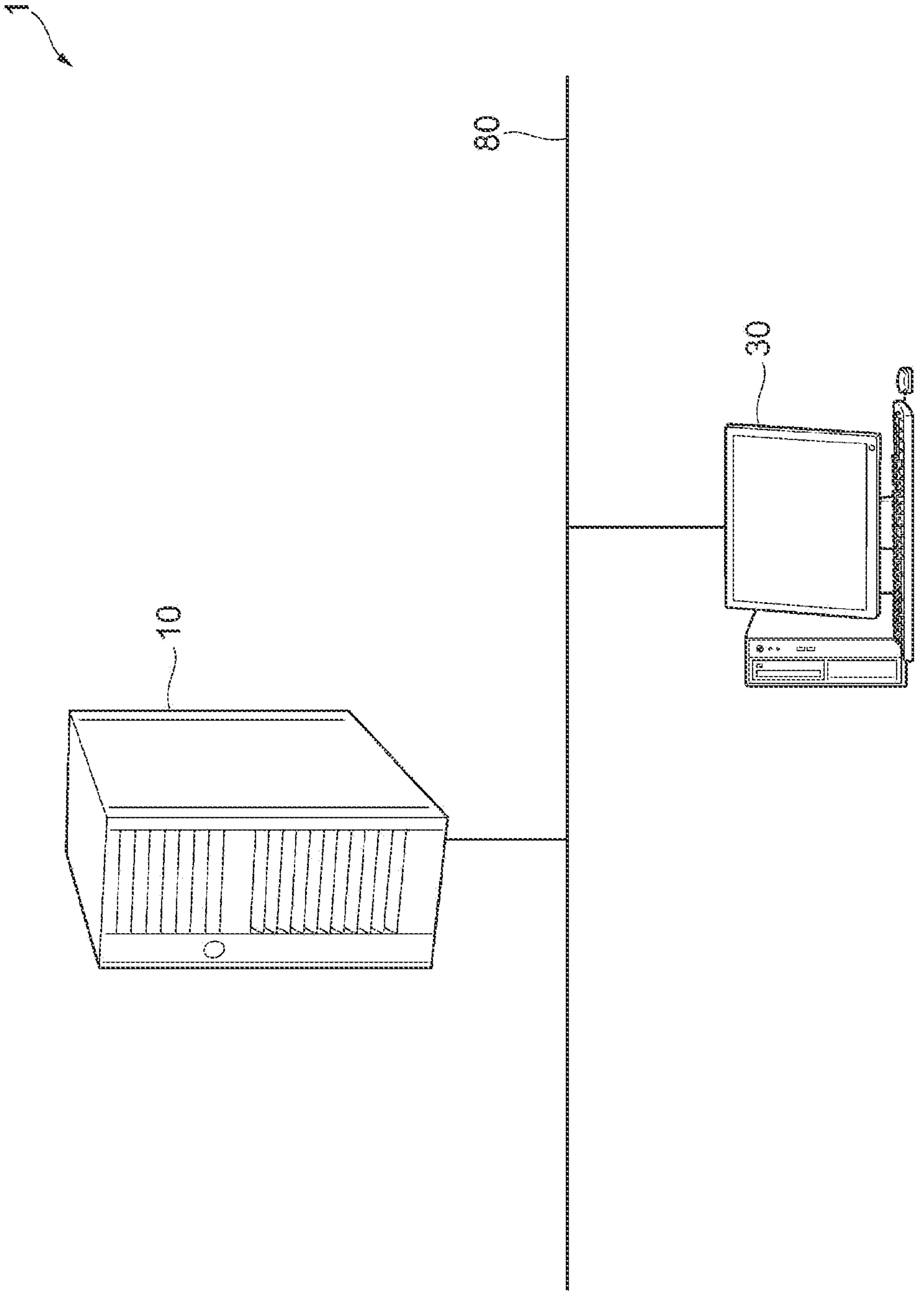
FIG. 1 is a diagram illustrating an example of the overall configuration of a difference display system according to an exemplary embodiment.

Hereinafter, exemplary embodiments of the present disclosure will be described in detail with reference to the attached drawings.

Overview of Exemplary Embodiment

An exemplary embodiment provides an information processing system that identifies at least one revised part changed between before and after editing of three-dimensional shape data representing a three-dimensional shape and controls a specific image that is based on the three-dimensional shape data and is obtained by viewing the three-dimensional shape from a specific viewpoint at which a feature value of the at least one revised part satisfies a predetermined condition to be displayed.

Three-dimensional shape data may be created by any kind of software as long as the three-dimensional shape data represents a three-dimensional shape. Hereinafter, a three-dimensional (3D) model (hereinafter, simply referred to as a "model"), which is three-dimensional model data created by three-dimensional computer aided design) 3D CAD software, will be described as an example.

Furthermore, as an example of an information processing system, a difference display system that displays the difference between before and after a model is edited in a drawing check step in designing of machineries, architectures, and so on using the 3D CAD software will be described. The drawing check step is a step in which a drawing checker who is a third party different from a designer evaluates function feasibility, design validity, adaptability, scalability, productivity, cost, and the like of a model created by the designer. A model may be edited due to a failure, a specification change, or the like detected at the stage of designing or prototyping. Thus, in the drawing check step, displaying the difference between before and after a model is edited is helpful.

[Overall Configuration of Difference Display System]

FIG. 1 is a diagram illustrating an example of the overall configuration of a difference display system 1 according to an exemplary embodiment. As illustrated in FIG. 1, the difference display system 1 includes a difference display apparatus 10 and a terminal apparatus 30 that are connected to a communication line 80. Although only one difference display apparatus 10 and one terminal apparatus 30 are illustrated in FIG. 1, two or more difference display apparatuses 10 or two or more terminal apparatuses 30 may be provided.

The difference display apparatus 10 acquires a model before being edited and a model after being edited and transmits a rendering image representing the difference between the model before being edited and the model after being edited to the terminal apparatus 30. For example, a general-purpose personal computer (PC) may be used as the difference display apparatus 10.

The terminal apparatus 30 receives a rendering image representing the difference between a model before being edited and a model after being edited from the difference display apparatus 10 and displays the rendering image on a display device. For example, a desktop PC, a notebook PC, a portable information terminal, or the like may be used as the terminal apparatus 30.

The communication line 80 is a line used for information communication between the difference display apparatus 10 and the terminal apparatus 30. For example, a local area network (LAN) or the Internet may be used as the communication line 80.

[Hardware Configuration of Difference Display Apparatus]

Figure 2:
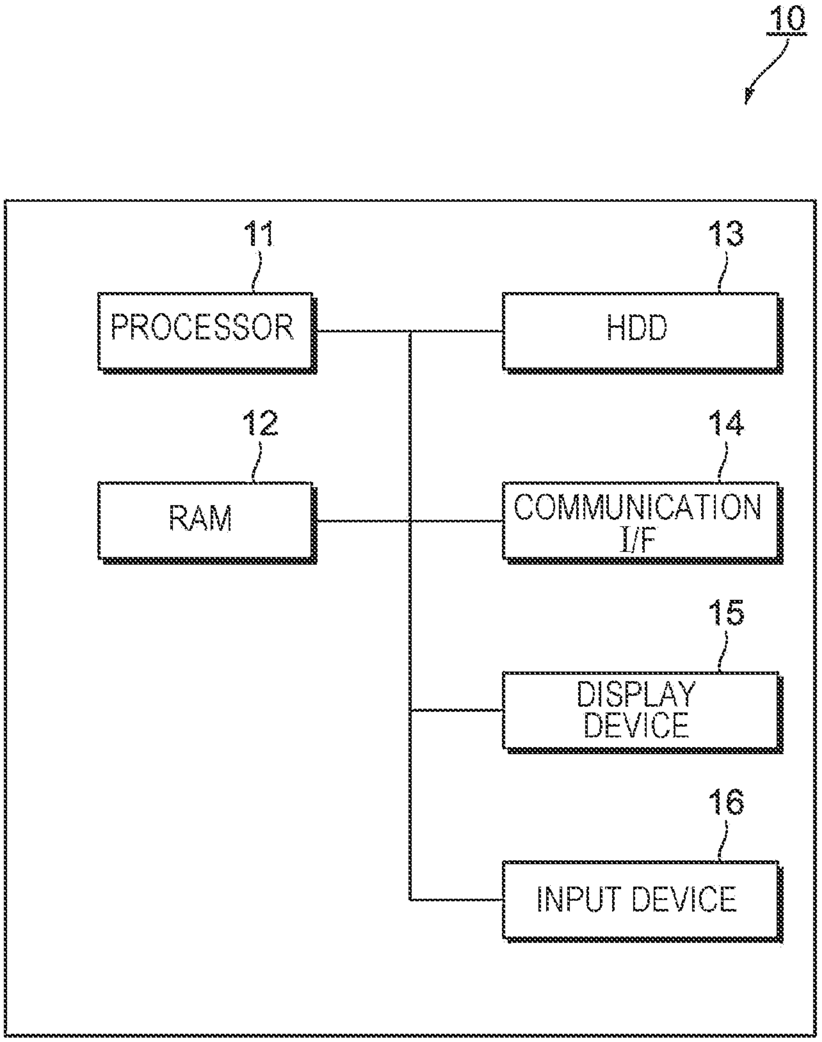
FIG. 2 is a diagram illustrating an example of the hardware configuration of a difference display apparatus according to an exemplary embodiment.

FIG. 2 is a diagram illustrating an example of the hardware configuration of the difference display apparatus 10 according to an exemplary embodiment. As illustrated in FIG. 2, the difference display apparatus 10 includes a processor 11, a random access memory (RAM) 12, a hard disk drive (HDD) 13, a communication interface (hereinafter, described as a "communication OF") 14, a display device 15, and an input device 16.

The processor 11 executes various types of software such as an operating system (OS) and applications and implements functions described later.

The RAM 12 is a memory used as an operation memory or the like for the processor 11.

The HDD 13 is, for example, a magnetic disk device that stores data to be input to the various types of software, data output from the various types of software, and the like.

The communication OF 14 transmits and receives various types of information to and from the terminal apparatus 30 and the like through the communication line 80.

The display device 15 is, for example, a display that displays various types of information.

The input device 16 includes, for example, a keyboard and a mouse to be used by a user to input information.

[Schematic Operation in Exemplary Embodiment]

First, a display example of a model M in the terminal apparatus 30 according to an exemplary embodiment will be described.

As an example, a virtual cuboid whose lengths in X-, Y-, and Z-directions are the same as the longest dimensions in X-, Y-, and Z-directions of a model M will be described.

Eight vertices of the cuboid are defined as a point A, a point B, a point C, a point D, a point E, a point F, a point G, and a point H. The point A is a point, out of the eight vertices, located on the negative side in all the X-, Y-, and Z-directions. The point B is a point, out of the eight vertices, located on the positive side in the X-direction and on the negative side in the Y- and Z-directions. The point C is a point, out of the eight vertices, located on the positive side in the Y-direction and on the negative side in the X- and Z-directions. The point D is a point, out of the eight vertices, located on the positive side in the Z-direction and on the negative side in the X- and Y-directions. The point E is a point, out of the eight vertices, located on the positive side in the X- and Y-directions and on the negative side in the Z-direction. The point F is a point, out of the eight vertices, located on the positive side in the X- and Z-directions and on the negative side in the Y direction. The point G is a point, out of the eight vertices, located on the positive side in the Y- and Z-directions and on the negative side in the X-direction. The point H is a point, out of the eight vertices, located on the positive side in all the X-, Y-, and Z-directions.

Figure 3:
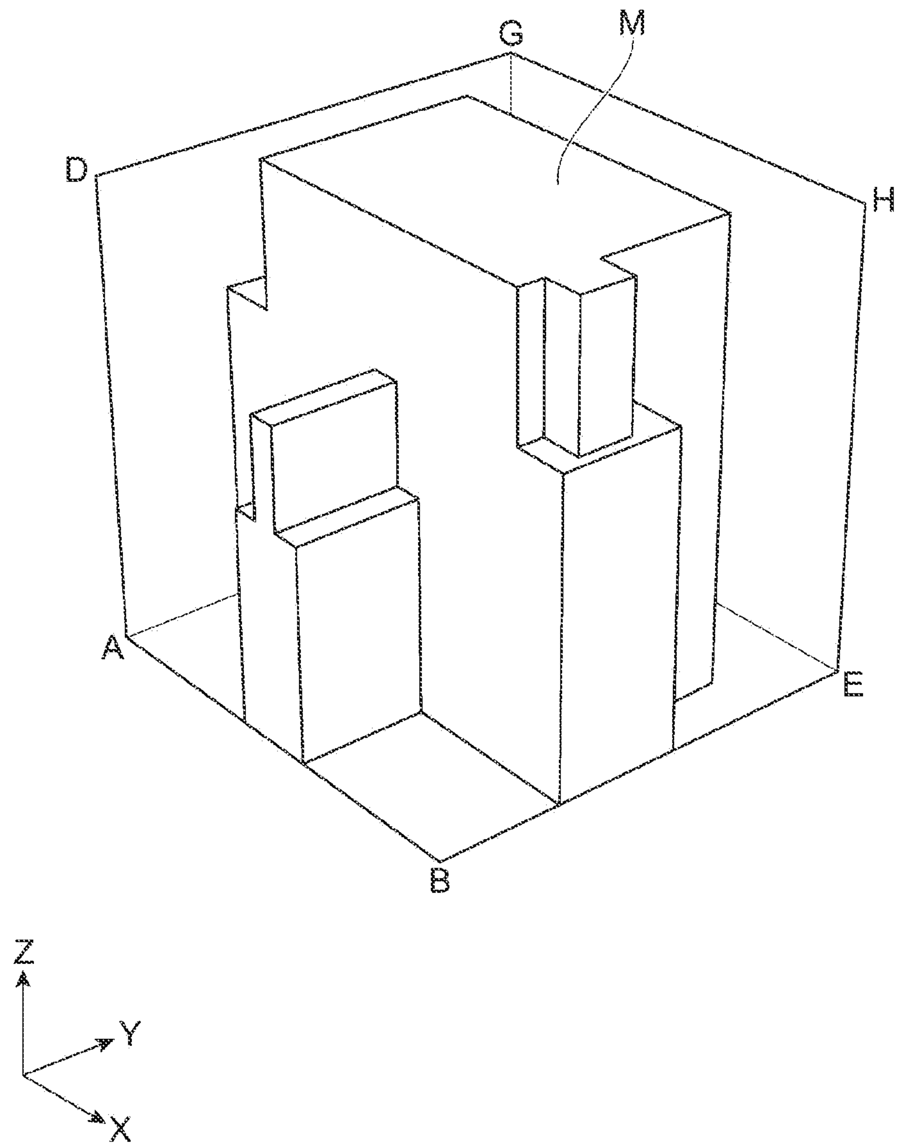
FIG. 3 is a diagram illustrating a display example of a model before being edited.

FIG. 3 is a diagram illustrating a display example of a model M before being edited.

Figure 4:
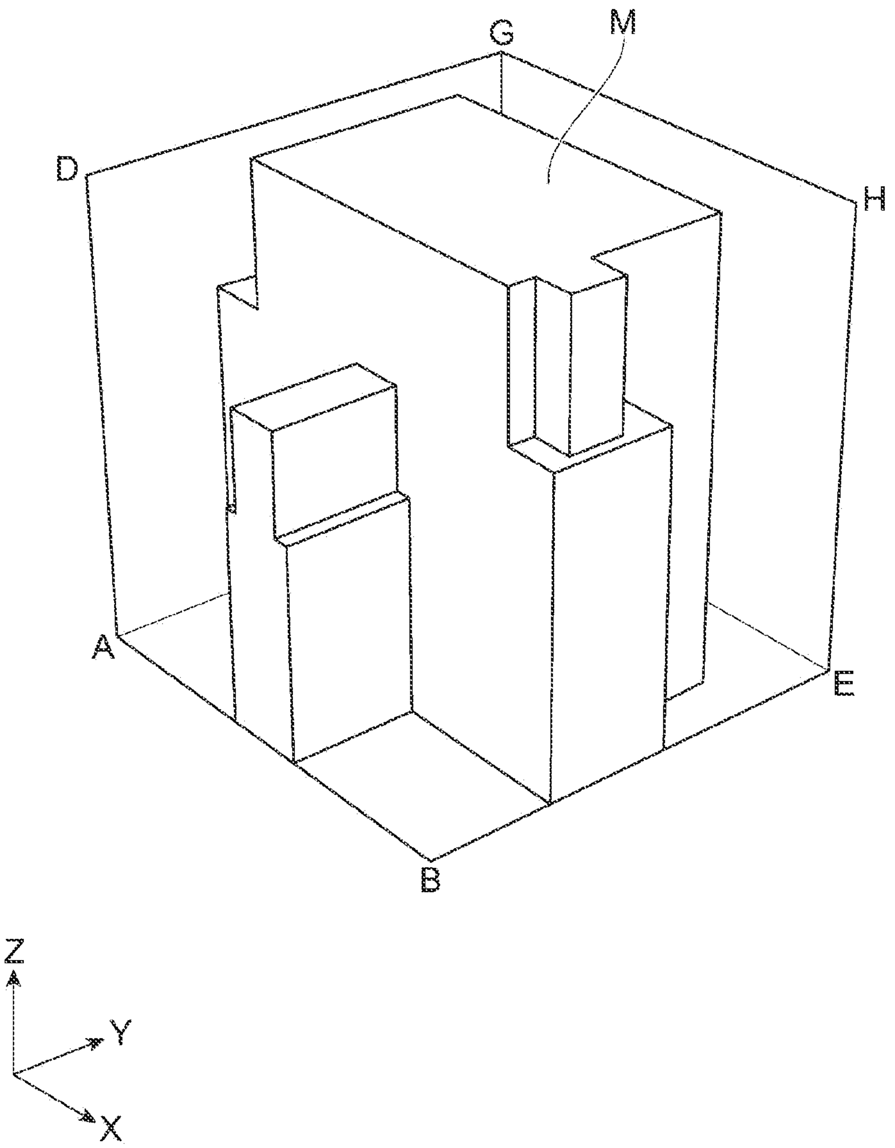
FIG. 4 is a diagram illustrating a display example of the model after being edited.

FIG. 4 is a diagram illustrating a display example of the model M after being edited. In FIG. 4, although the model M is changed, no treatment is performed to a revised part. Thus, it is difficult to understand which part of the model M has been changed.

Figure 5:
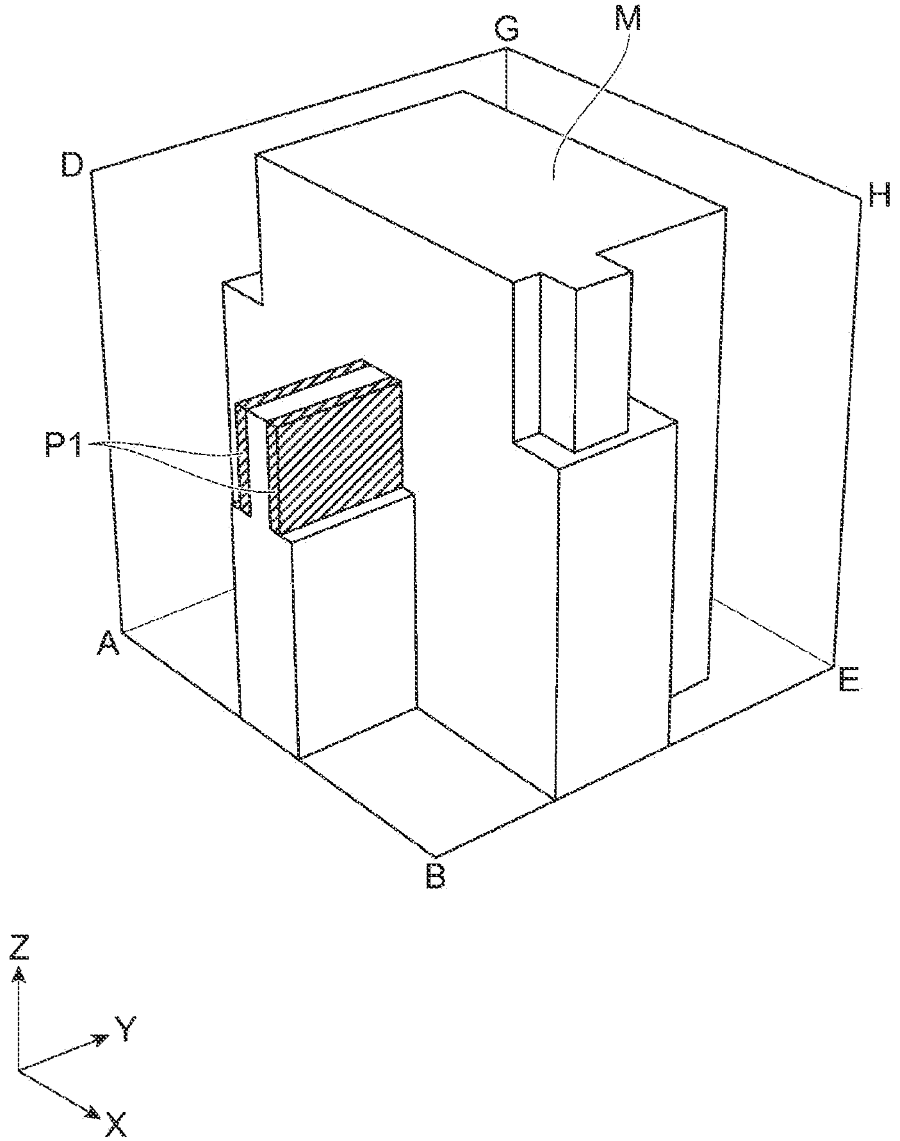
FIG. 5 is a diagram illustrating a display example of the model after being edited in the case where a revised part in the model is displayed in a manner different from a manner in which a non-revised part in the model is displayed.

FIG. 5 is a diagram illustrating a display example of the model M after being edited in the case where a revised part in the model M is displayed in a manner different from a manner in which a non-revised part in the model M is displayed. In this example, out of a plurality of revised parts in the model M, a part added to the model M is hatched with thick oblique lines and a part deleted from the model M is hatched with thin oblique lines. In FIG. 5, however, only a revised part P1, out of the plurality of revised parts, is able to be seen. Although it is assumed that the model M also includes revised parts P2 to P4, the revised parts P2 to P4 are not able to be seen in FIG. 5. Although a part added to the model M and a part deleted from the model M are discriminated from each other by hatching with different types of oblique lines, these parts may be discriminated from each other by using different colors.

Figure 6:
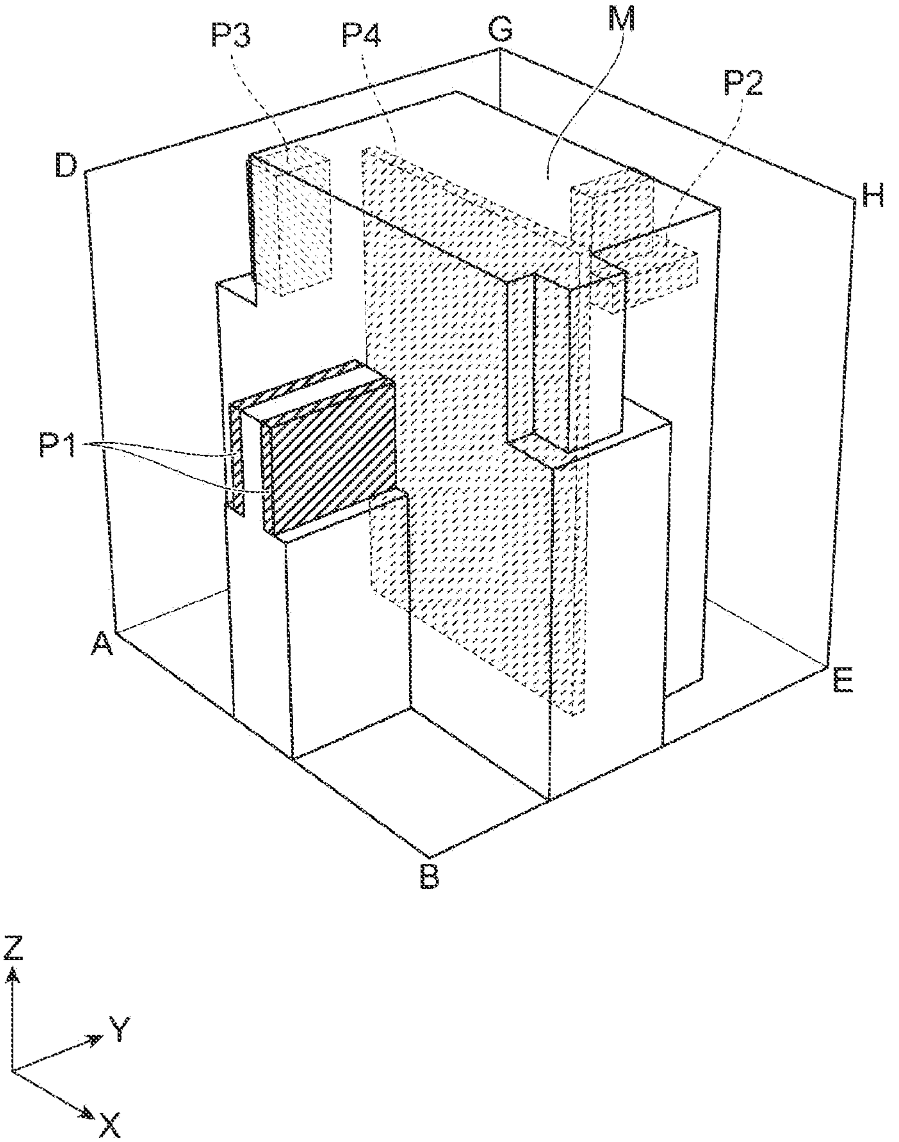
FIG. 6 is a diagram illustrating a display example of the model after being edited in the case where the non-revised part in the model is made semi-transparent.

FIG. 6 is a diagram illustrating a display example of the model M after being edited in the case where the non-revised part in the model M is made semi-transparent. In FIG. 6, the revised parts P2 to P4, which are not able to be seen in FIG. 5, are also able to be seen. However, making the non-revised part in the model M semi-transparent makes it difficult to understand display of the model M. For example, it is difficult to understand an outer shape, and it is also difficult to understand a change in an annotation such as dimension and material of the model M. An annotation is a note that is expressed by text or the like on a model M and provided to indicate information such as materials of parts of the model M.

In this exemplary embodiment, a viewpoint from which the model M is viewed is moved. Although a default viewpoint is set irrespective of a revised part in FIGS. 3 to 6, the viewpoint is moved so that the revised part P1 will be able to be seen clearly and other revised parts will also be able to be seen clearly.

FIGS. 7 to 10 are diagrams illustrating display examples in the case where a viewpoint is moved under a first condition. The first condition is a condition that the area of a revised part with the largest change amount is displayed to be the largest.

Figure 7:
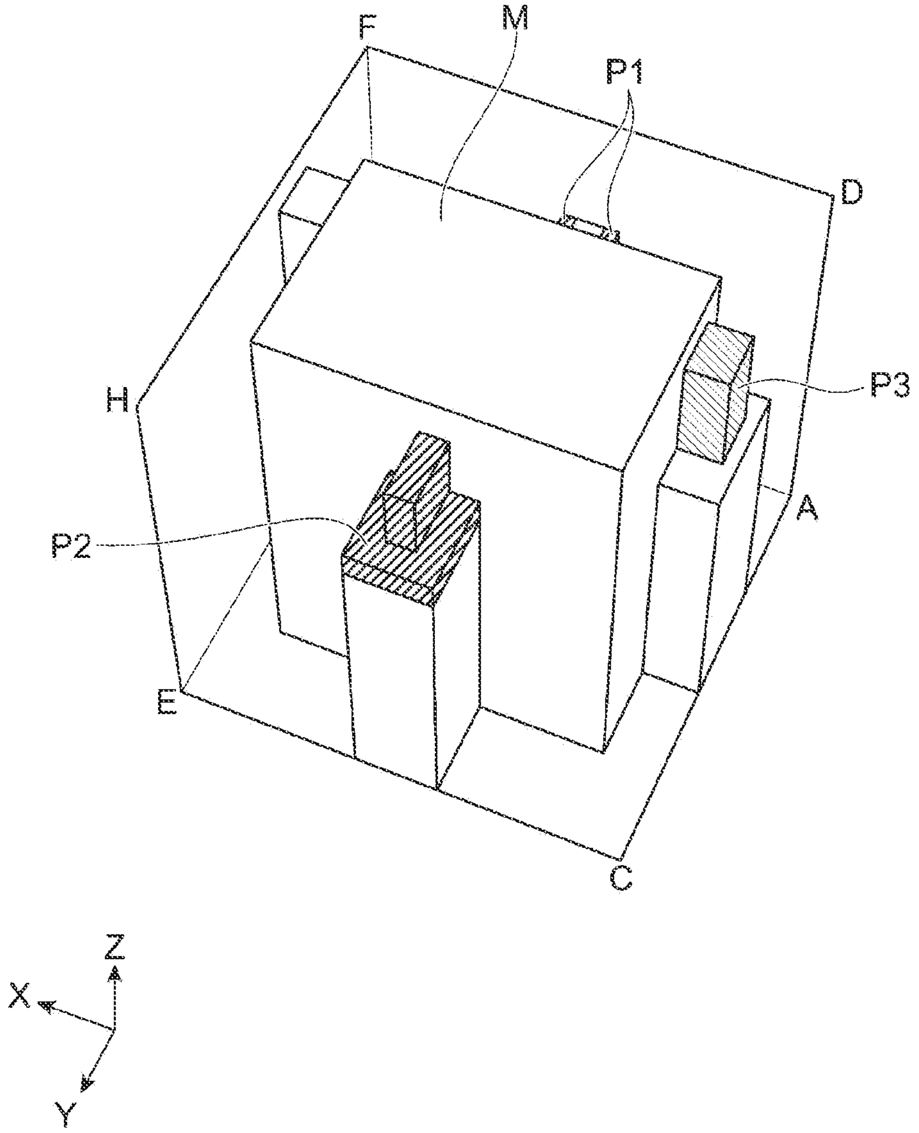
FIG. 7 is a diagram illustrating a first display example in a case where a viewpoint is moved under a first condition.

FIG. 7 is a diagram illustrating a first display example of this case. In FIG. 7, the area of the revised part P2, which has the largest change amount, is displayed to be the largest. For example, when a predetermined time has passed in the state in which the display example illustrated in FIG. 5 is displayed, the viewpoint may be moved as in the display example illustrated in FIG. 7.

Figure 8:
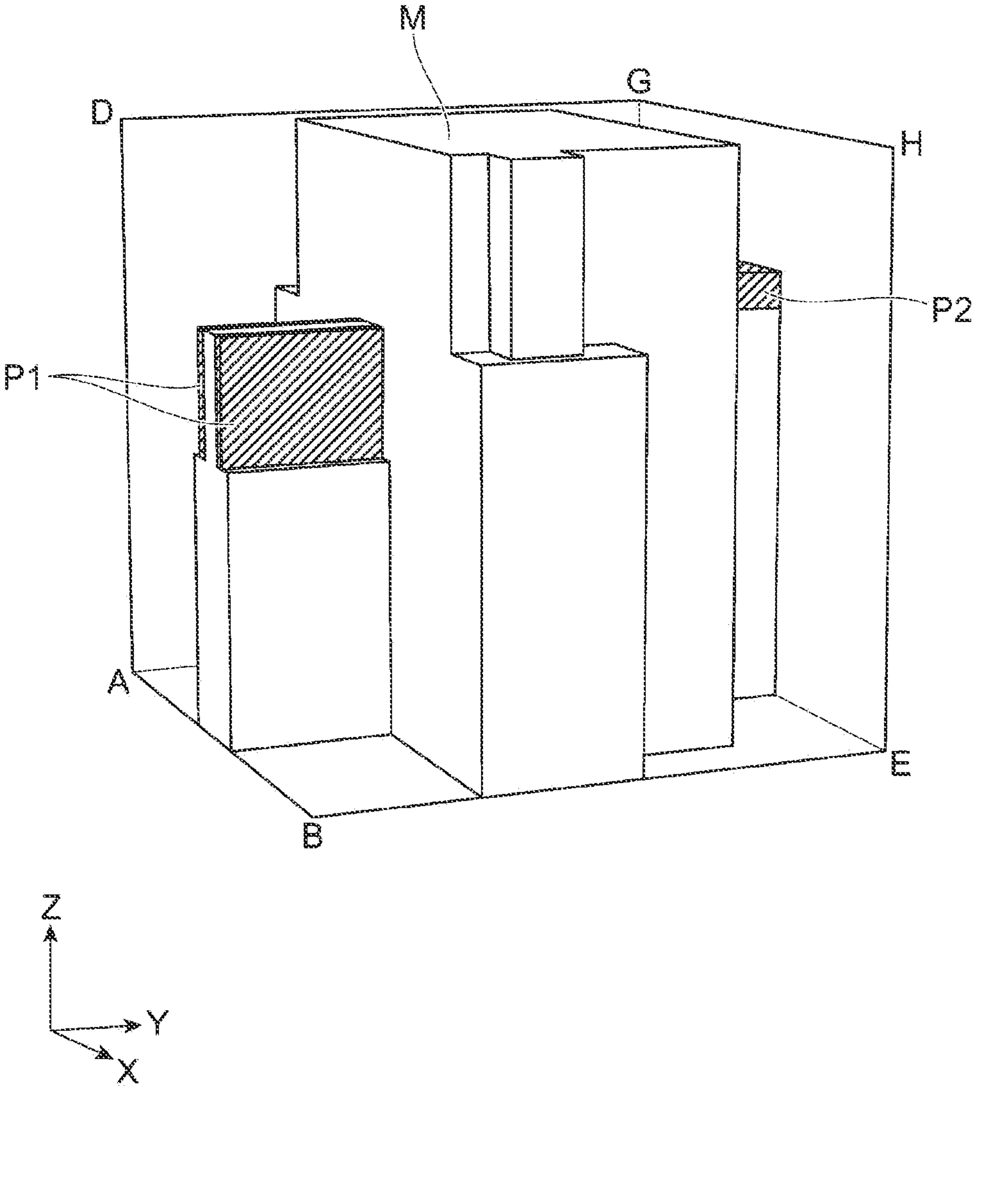
FIG. 8 is a diagram illustrating a second display example in a case where a viewpoint is moved under the first condition.

FIG. 8 is a diagram illustrating a second display example of this case. In FIG. 8, the area of the revised part P1, which has the largest change amount other than the revised part P2, the area of which has already been displayed to be the largest, is displayed to be the largest. For example, when a user performs a predetermined operation in the state in which the display example illustrated in FIG. 7 is displayed, the viewpoint may be moved as in the display example illustrated in FIG. 8.

Figure 9:
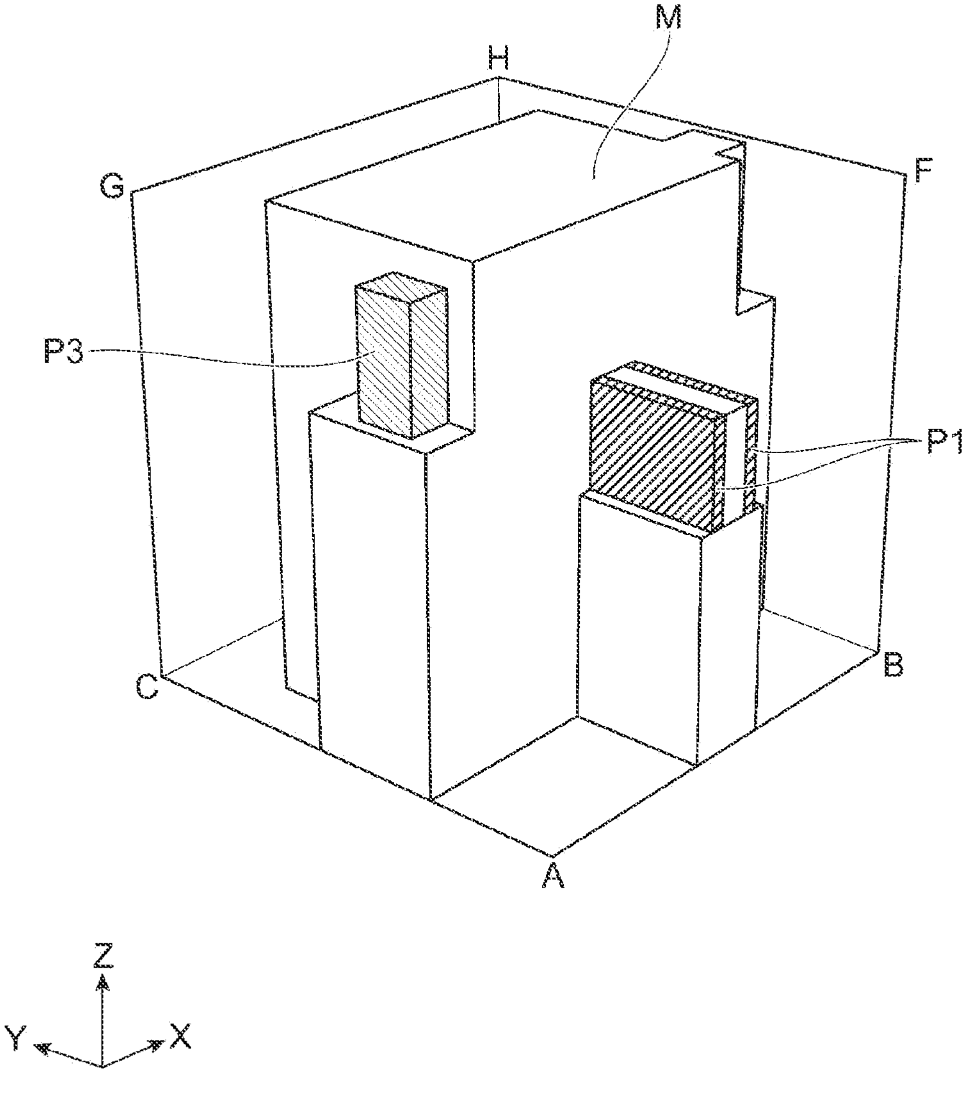
FIG. 9 is a diagram illustrating a third display example in a case where a viewpoint is moved under the first condition.

FIG. 9 is a diagram illustrating a third display example of this case. In FIG. 9, the area of the revised part P3, which has the largest change amount other than the revised parts P1 and P2, the areas of which have already been displayed to be the largest, is displayed to be the largest. For example, when the user performs a predetermined operation in the state in which the display example illustrated in FIG. 8 is displayed, the viewpoint may be moved as in the display example illustrated in FIG. 9.

Figure 10:
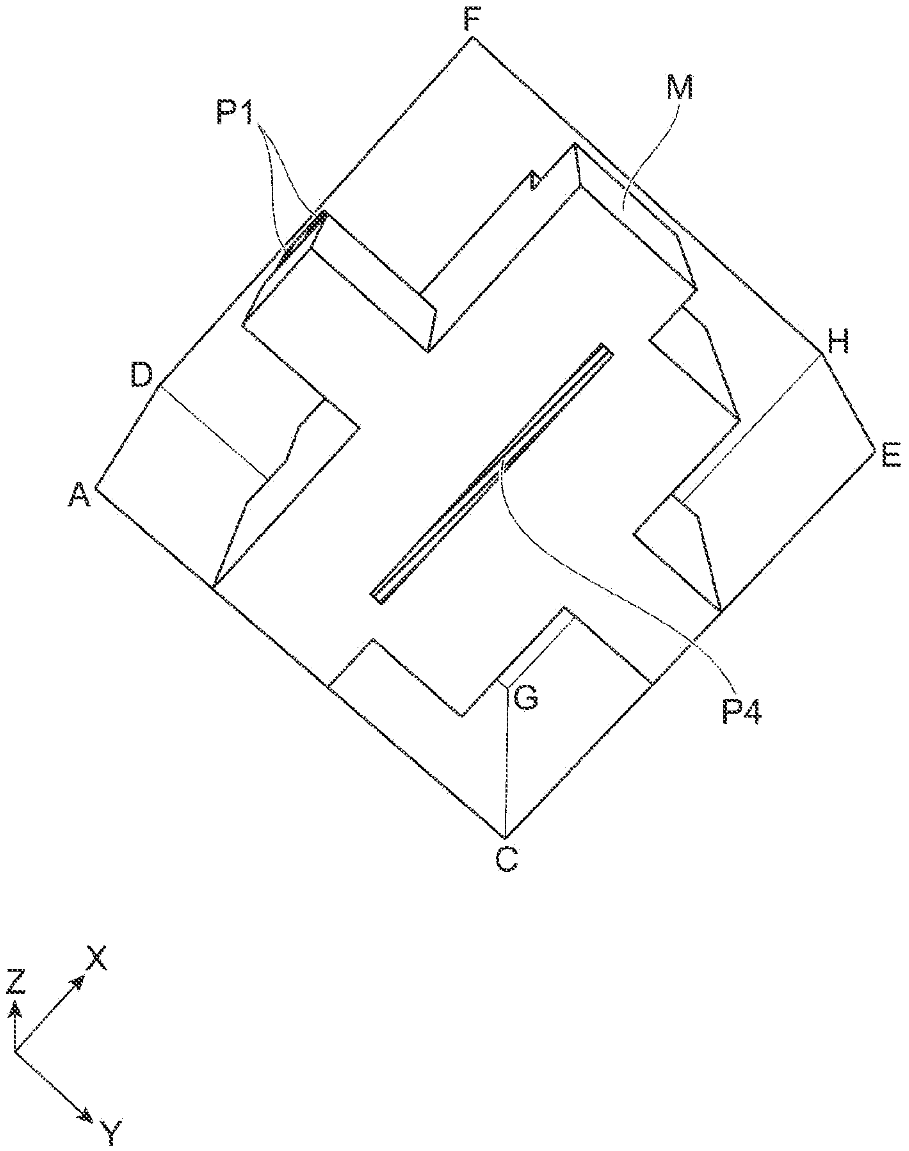
FIG. 10 is a diagram illustrating a fourth display example in a case where a viewpoint is moved under the first condition.

FIG. 10 is a diagram illustrating a fourth display example of this case. In FIG. 10, the area of the revised part P4, which has the largest change amount other than the revised parts P1 to P3, the areas of which have already been displayed to be the largest, is displayed to be the largest. For example, when the user performs a predetermined operation in the state in which the display example illustrated in FIG. 9 is displayed, the viewpoint may be moved as in the display example illustrated in FIG. 10.

Then, when there is no revised part to be displayed, movement of the viewpoint ends.

In FIGS. 7 to 10, the first condition is that the area of a revised part with the largest change amount is displayed to be the largest. However, the first condition is not limited to the condition described above. For example, the first condition may be a condition that the total area of revised parts is displayed to be the largest.

Figure 11:
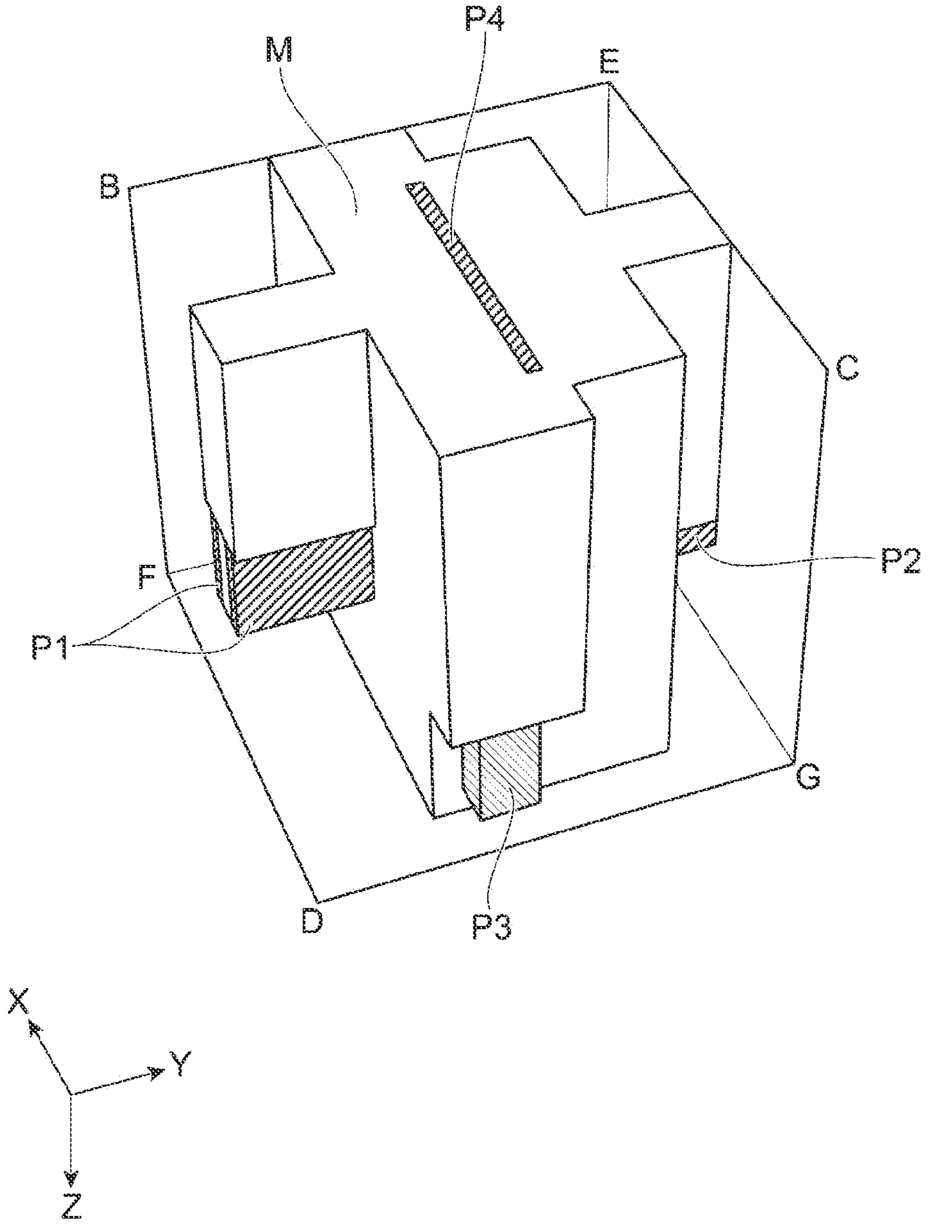
FIG. 11 is a diagram illustrating a display example in a case where a viewpoint is moved under a second condition.

FIG. 11 is a diagram illustrating a display example in the case where a viewpoint is moved under a second condition. The second condition is a condition that the total number of revised parts is displayed to be the largest. In FIG. 11, all the revised parts P1 to P4 are displayed. For example, when a predetermined time has passed in the state in which the display example illustrated in FIG. 5 is displayed, the viewpoint may be moved as in the display example illustrated in FIG. 11.

An example in which in the case where there are a plurality of viewpoints, when the user performs a predetermined operation, a viewpoint is moved to another viewpoint has been described above. An operation for moving a viewpoint may be performed as described below.

Figure 12:
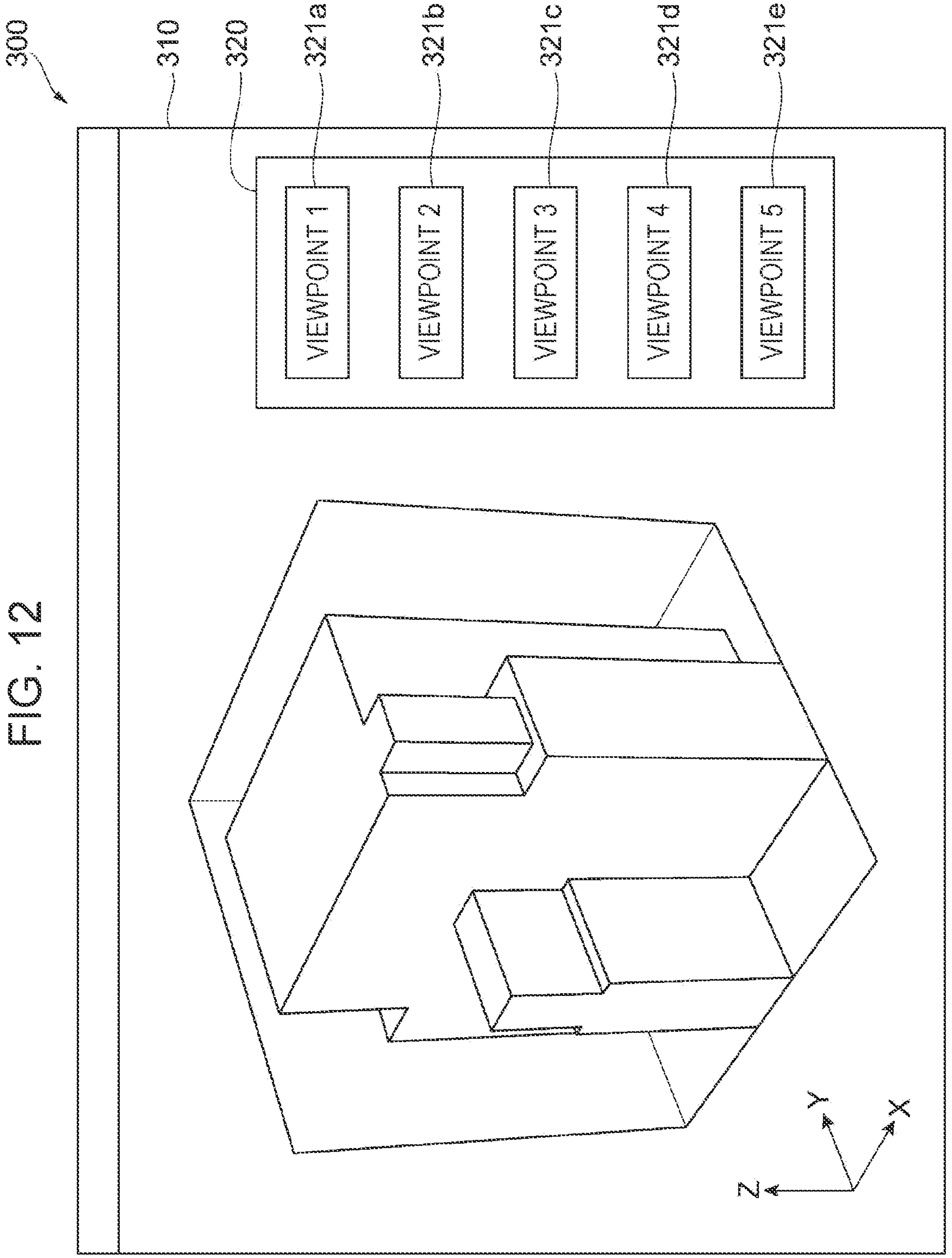
FIG. 12 is a diagram illustrating an example of a screen on which a user performs an operation for moving a viewpoint.

FIG. 12 is a diagram illustrating an example of a screen 300 on which the user performs an operation for moving a viewpoint. As illustrated in FIG. 12, the screen 300 includes a display region 310 in which a rendering image of the model M is displayed and a display region 320 in which selection buttons 321 (321*a* to 321*e*) are displayed. When the user selects one of the selection buttons 321 in the display region 320, a viewpoint corresponding to the selected selection button 321 is set, and a rendering image of the model M viewed from the viewpoint is displayed in the display region 310.

[Functional Configuration of Difference Display Apparatus]

Figure 13:
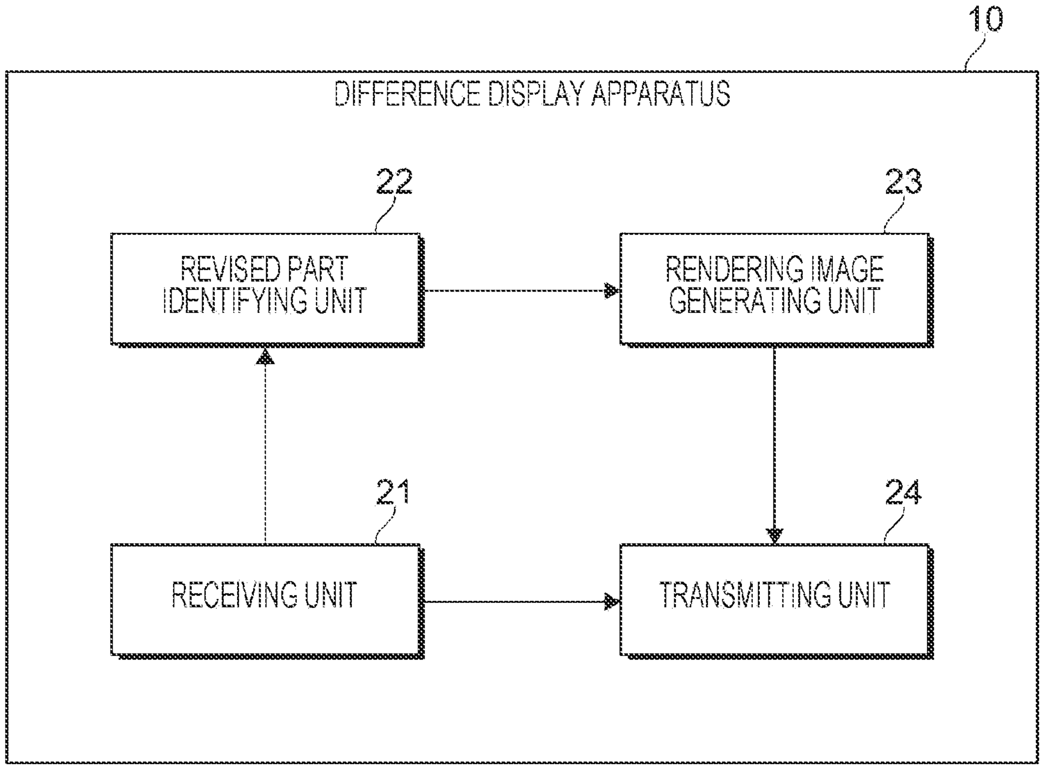
FIG. 13 is a block diagram illustrating an example of the functional configuration of a difference display apparatus according to an exemplary embodiment.

FIG. 13 is a block diagram illustrating an example of the functional configuration of the difference display apparatus 10 that performs the schematic operation described above and the like. As illustrated in FIG. 13, the difference display apparatus 10 includes a receiving unit 21, a revised part identifying unit 22, a rendering image generating unit 23, and a transmitting unit 24.

The receiving unit 21 receives a model before being edited and a model after being edited. For example, the receiving unit 21 may receive a model before being edited and a model after being edited from a terminal apparatus (not illustrated in FIG. 13) that a designer uses.

The revised part identifying unit 22 compares the model before being edited with the model after being edited that are received by the receiving unit 21 and identifies a revised part changed between before and after the editing of the model. In this exemplary embodiment, as an example of identifying at least one revised part changed between before and after editing of three-dimensional shape data representing a three-dimensional shape, processing of the revised part identifying unit 22 is performed.

The rendering image generating unit 23 determines a viewpoint at which the feature value of a revised part identified by the revised part identifying unit 22 satisfies a predetermined condition, and generates a rendering image that is obtained by performing two-dimensional rendering by viewing the model from the viewpoint. In this exemplary embodiment, as an example of a specific image that is based on the three-dimensional shape data and is obtained by viewing the three-dimensional shape from a specific viewpoint at which a feature value of the at least one revised part satisfies a predetermined condition, a rendering image is used.

The rendering image generating unit 23 may use, as the feature value of a revised part, for example, the area of a specific revised part among a plurality of revised parts in a rendering image, that is, the area of the specific revised part in the case where the specific revised part is displayed. A specific revised part may be the most important revised part among a plurality of revised parts. The most important revised part may be, for example, a revised part with the largest change amount, that is, a revised part with the largest difference between before and after a change. If a change is addition or deletion, a change amount may be regarded as the amount of change in the volume of a revised part changed between before and after the change. In this case, a predetermined condition may be, for example, a condition that the area of a specific revised part is displayed to be the largest.

The rendering image generating unit 23 may use, as the feature value of a revised part, for example, the total area of a plurality of revised parts in a rendering image, that is, the total area of a plurality of revised parts in the case where the plurality of revised parts are displayed. In this case, the predetermined condition may be, for example, a condition that the total area is displayed to be the largest.

The rendering image generating unit 23 may use, as the feature value of a revised part, for example, the number of revised parts in a rendering image, that is, the number of displayed revised parts. In this case, the predetermined condition may be, for example, a condition that the number of revised parts is displayed to be the largest.

Furthermore, the rendering image generating unit 23 may calculate each of the feature values described above by changing a weight depending on the content of a change to a model, that is, depending on whether a change to the model is addition or deletion. In other words, the rendering image generating unit 23 may calculate each of the feature values described above by changing the weight depending on whether the three-dimensional shape of a revised part is a protrusion or a recess.

The rendering image generating unit 23 may calculate each of the feature values described above by changing the weight depending on whether a change to the model is a change regarding a shape or a change regarding an annotation such as tolerance, dimension, or material.

The rendering image generating unit 23 may calculate each of the feature values described above by changing the weight depending on whether a revised part is a part that is able to be seen without a non-revised part in the model being made semi-transparent or a part that is able to be seen by making the non-revised part in the model semi-transparent. In this case, the weight on the part that is able to be seen by making the non-revised part in the model semi-transparent may be smaller than the weight on the part that is able to be seen without the non-revised part in the model being made semi-transparent. The feature value of the part that is able to be seen without the non-revised part in the model being made semi-transparent is an example of a first feature value of a revised part that is able to be seen in an image without a non-revised part in the three-dimensional shape being made transparent among the at least one revised part, and the weight on the feature value of the part that is able to be seen without the non-revised part in the model being made semi-transparent is an example of a first weight, which is the weight on the first feature value. Furthermore, the feature value of the part that is able to be seen by making the non-revised part in the model semi-transparent is an example of a second feature value of a revised part that is able to be seen in the image by making the non-revised part transparent among the at least one revised part, and the weight on the feature value of the part that is able to be seen by making the non-revised part in the model semi-transparent is an example of a second weight, which is the weight on the second feature value and is smaller than the first weight. Furthermore, the feature value calculated here is an example of the feature value calculated based on the first feature value, the first weight, the second feature value, and the second weight. The rendering image generating unit 23 may perform processing in such a manner that an annotation is added only to a revised part that is able to be seen without a non-revised part in the model being made semi-transparent and no annotation is added to a revised part that is able to be seen by making the non-revised part in the model semi-transparent.

Furthermore, the rendering image generating unit 23 may identify a plurality of viewpoints depending on the degree of how much the feature value of a revised part satisfies a predetermined condition and generate a plurality of rendering images in association with positions in the order based on the individual degrees.

For example, the rendering image generating unit 23 may identify, for individual types of feature values of a revised part, a plurality of viewpoints corresponding to the degrees of how much the feature values satisfy a predetermined condition and generate a plurality of rendering images in association with positions in the order based on the individual degrees for the individual types of the feature values.

Specifically, in the case where the area of a revised part is designated as the type of a feature value, a plurality of rendering images may be generated in association with positions in the order based on the individual areas, such as a rendering image with the area in the first position, a rendering image with the area in the second position, and so on. In this case, a rendering image with the area in the first position is an example of an image obtained by viewing the three-dimensional shape from a viewpoint at which the degree of how much the feature value satisfies a predetermined condition is a first degree. Furthermore, a rendering image with the area in the second position is an example of an image obtained by viewing the three-dimensional shape from a viewpoint at which the degree of how much the feature value satisfies the predetermined condition is a second degree, which is lower than the first degree.

In the case where the number of revised parts is designated as the type of a feature value, a plurality of rendering images may be generated in association with positions in the order based on the individual numbers of revised parts, such as a rendering image with the number of revised parts in the first position, a rendering image with the number of revised parts in the second position, and so on. In this case, a rendering image with the number of revised parts in the first position is an example of an image obtained by viewing the three-dimensional shape from a viewpoint at which the degree of how much a feature value satisfies the predetermined condition is the first degree. Furthermore, a rendering image with the number of revised parts in the second position is an example of an image obtained by viewing the three-dimensional shape from a viewpoint at which the degree of how much the feature value satisfies the predetermined condition is the second degree, which is lower than the first degree.

For example, the rendering image generating unit 23 may identify a plurality of viewpoints depending on the degree of how much each of different types of feature values of a revised part satisfies a predetermined condition and generate a plurality of rendering images in association with positions in the order based on the individual degrees. Specifically, a plurality of rendering images may be generated in association with positions in the order based on the individual areas and positions in the order based on the individual numbers of revised parts, such as a rendering image with the area in the first position, a rendering image with the number of revised parts in the first position, a rendering image with the area in the second position, a rendering image with the number of revised parts in the second position, and so on. In this case, a rendering image with the area in the first position is an example of an image obtained by viewing the three-dimensional shape from a viewpoint at which the degree of how much a first feature value satisfies a first condition that is the predetermined condition corresponding to the first feature value is a specific degree. A rendering image with the number of revised parts in the first position is an example of an image obtained by viewing the three-dimensional shape from a viewpoint at which the degree of how much a second feature value satisfies a second condition that is the predetermined condition corresponding to the second feature value is the specific degree. The type of a feature value used to identify a viewpoint may be changed by an operation by a user.

The transmitting unit 24 transmits a rendering image generated by the rendering image generating unit 23 to the terminal apparatus 30 so that the rendering image will be displayed on the terminal apparatus 30. In this exemplary embodiment, as an example of controlling the specific image to be displayed, processing of the transmitting unit 24 is performed.

Specifically, first, the transmitting unit 24 transmits the first rendering image obtained by performing two-dimensional rendering by viewing the model from a default viewpoint to the terminal apparatus 30. After that, when a predetermined event occurs, the transmitting unit 24 transmits the next rendering image generated by the rendering image generating unit 23 to the terminal apparatus 30. The transmitting unit 24 may sequentially transmit rendering images halfway through a change from the first rendering image to the next rendering image so that animation display is able to be provided on the terminal apparatus 30. In this exemplary embodiment, as an example of performing control in such a manner that, after controlling an image obtained by viewing the three-dimensional shape from a predetermined viewpoint to be displayed, when a predetermined event occurs, the specific image is displayed, the above-mentioned processing of the transmitting unit 24 is performed. A predetermined event may be an event in which a predetermined time passes or may be an event in which a user performs a predetermined operation.

Furthermore, in the case where the rendering image generating unit 23 generates a plurality of rendering images in association with positions in an order, when a predetermined event occurs, the transmitting unit 24 sequentially transmits the plurality of rendering images to the terminal apparatus 30 in accordance with the positions in the order. The transmitting unit 24 may sequentially transmit rendering images halfway through a change from a rendering image to the next rendering image so that animation display is able to be provided on the terminal apparatus 30. In this exemplary embodiment, as an example of performing control in such a manner that, after controlling the specific image to be displayed, when a predetermined event occurs, a different image that is obtained by viewing the three-dimensional shape from a different viewpoint at which the feature value satisfies the predetermined condition is displayed, the above-mentioned processing of the transmitting unit 24 is performed. A predetermined event may be an event in which a predetermined time passes or an event in which a user performs an operation for selecting a display element representing the different viewpoint from among a plurality of display elements representing a plurality of viewpoints. The selection buttons 321 (321*a* to 321*e*) in FIG. 12 are examples of a plurality of display elements representing a plurality of viewpoints.

Furthermore, the transmitting unit 24 may transmit rendering images obtained by performing two-dimensional rendering by viewing the model from viewpoints in accordance with an operation for continuously moving the viewpoint by the user to the terminal apparatus 30. An operation for continuously moving the viewpoint by the user is, for example, an operation for, in the case where the user operates the terminal apparatus 30 using a pointer device such as a mouse, continuously moving the viewpoint in accordance with the direction and distance of a dragging operation by performing the dragging operation while a left-click on the mouse being maintained. This operation is an example of a user operation for causing the processor 11 to control images obtained by viewing the three-dimensional shape from the plurality of viewpoints to be sequentially displayed. At this time, when a viewpoint designated by the user during a viewpoint moving operation and a viewpoint determined by the rendering image generating unit 23 are the same, the transmitting unit 24 may transmit a notification indicating that the designated viewpoint and the determined viewpoint are the same to the terminal apparatus 30. In this case, information about the viewpoint moving operation by the user may be received by the receiving unit 21 and delivered to the transmitting unit 24. Thus, The terminal apparatus 30 may provide feedback in the form of sound, vibrations, or the like to the user or fix the viewpoint during the moving operation by the user to the viewpoint designated by the user. In this exemplary embodiment, as an example of controlling images obtained by viewing the three-dimensional shape from a plurality of viewpoints to be sequentially displayed in accordance with an operation by a user and providing, when an image obtained by viewing the three-dimensional shape from the specific viewpoint is displayed, a notification indicating that the image obtained by viewing the three-dimensional shape from the specific viewpoint is displayed to the user, above-mentioned the processing of the transmitting unit 24 is performed.

[Example of Operation of Difference Display Apparatus]

First, the receiving unit 21 of the difference display apparatus 10 receives a model before being edited and a model after being edited.

Next, the revised part identifying unit 22 of the difference display apparatus 10 compares the model before being edited with the model after being edited that are received by the receiving unit 21 and identifies a revised part changed between before and after the editing of the model.

Next, the rendering image generating unit 23 of the difference display apparatus 10 generates a rendering image obtained by performing two-dimensional rendering by viewing a model from a viewpoint at which the feature value of the revised part identified by the revised part identifying unit 22 satisfies a predetermined condition.

This operation of the rendering image generating unit 23 will be described in detail below.

Figure 14:
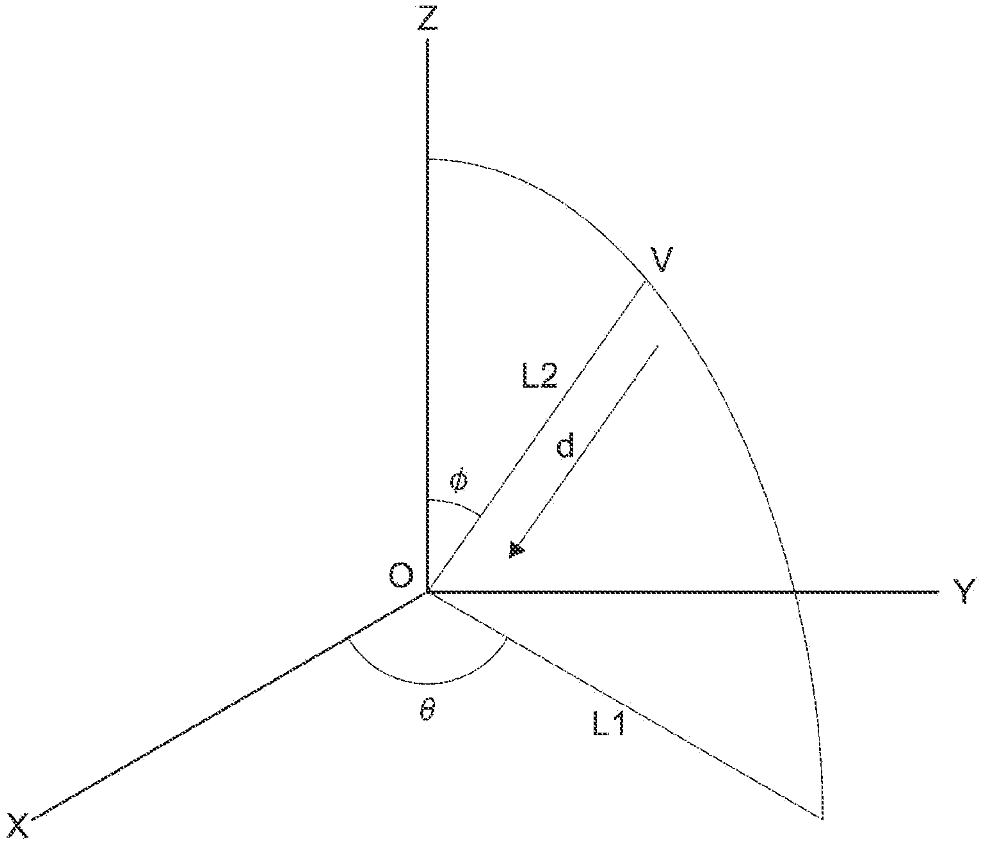
FIG. 14 is a diagram illustrating the concept of an operation of a rendering image generating unit of a difference display apparatus according to an exemplary embodiment.

FIG. 14 is a diagram illustrating the concept of this operation. As illustrated in FIG. 14, a straight line that lies on an XY plane and is tilted from an X-axis by 0 degrees is represented by L1, and a straight line that lies on a plane including the straight line L1 and a Z-axis and is tilted from the Z-axis by φ degrees is represented by L2. Then, a viewpoint V is set at a position that is away from an origin O by a distance d on the straight line L2 in such a manner that the viewpoint V is always directed toward the origin O (center of a model). In this state, by taking into account all the combinations that may be taken by the angles φ and θ, feature values obtained by viewing from any viewpoints will be considered.

Figure 15:
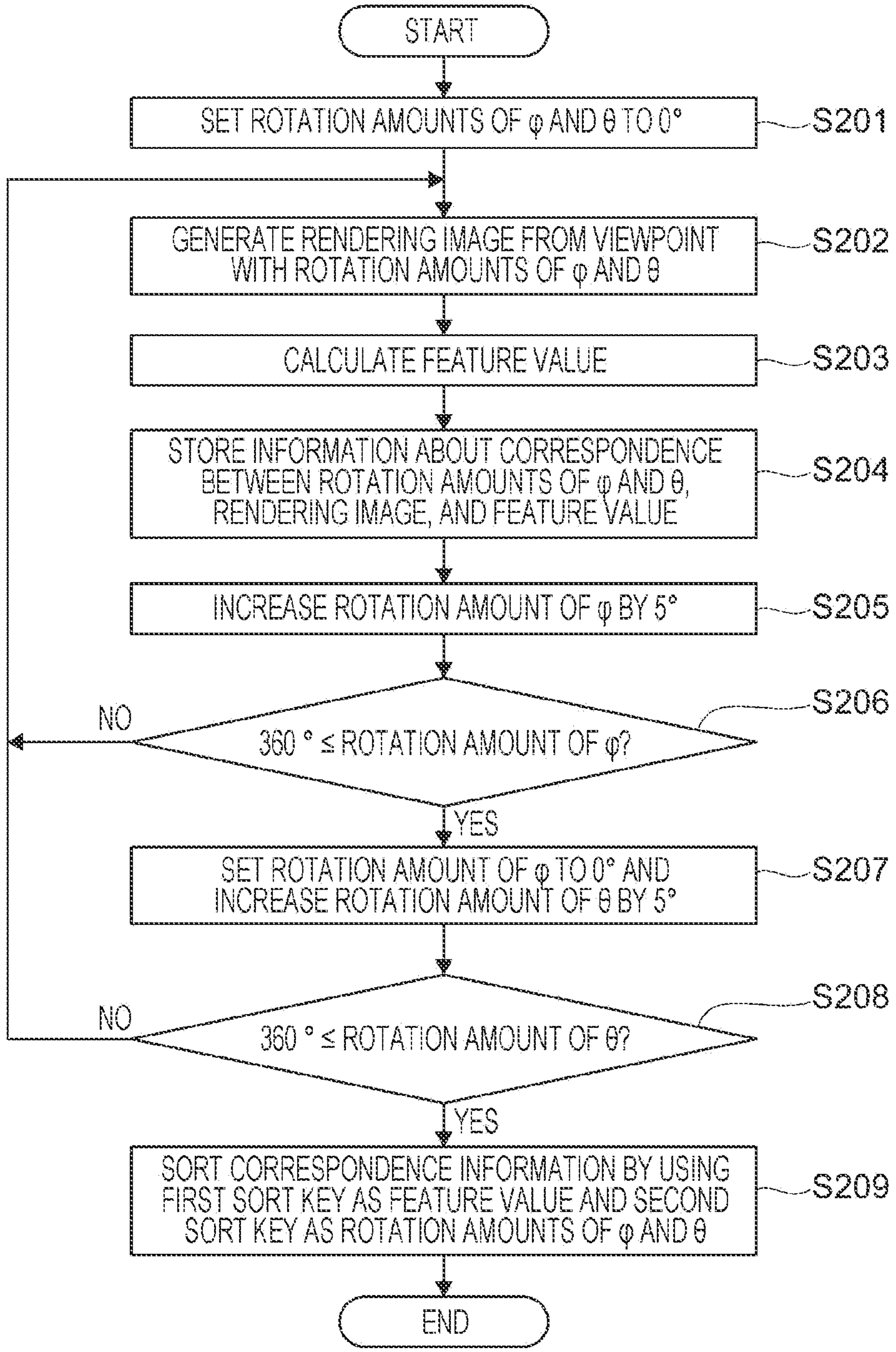
FIG. 15 is a flowchart illustrating an operation example of the rendering image generating unit of the difference display apparatus according to an exemplary embodiment.

FIG. 15 is a flowchart illustrating an example of an operation of the rendering image generating unit 23.

As illustrated in FIG. 15, first, the rendering image generating unit 23 sets the rotation amounts of q and 0 to 0 degrees (step 201).

Then, the rendering image generating unit 23 generates a rendering image obtained by performing two-dimensional rendering of a model viewed from a viewpoint with the current rotation amounts of φ and θ (step 202). In this case, the current rotation amounts of φ and θ represent the rotation amounts of φ and θ set in step 201 or set in step 205 or step 207 as described later.

Next, the rendering image generating unit 23 calculates a feature value of the rendering image generated in step 202 (step 203). The feature value represents the area of a specific revised part among a plurality of revised parts in the rendering image, the total area of a plurality of revised parts in the rendering image, the number of revised parts in the rendering image, or the like.

Thus, the rendering image generating unit 23 stores correspondence information in which the current rotation amounts of φ and θ, the rendering image generated in step 202, and the feature value calculated in step 203 are associated with one another (step 204). The address of a region in which the rendering image is stored may be associated with the rendering image.

Then, the rendering image generating unit 23 increases the rotation amount of φ by 5 degrees (step 205). The increase width, which is 5 degrees, of the rotation amount of φ is merely an example. From the point of view of reducing the amount of calculation, the increase width of the rotation amount of φ may be, for example, 30 degrees, 60 degrees, or the like. Then, the rendering image generating unit 23 determines whether or not the rotation amount of φ has reached 360 degrees or more (step 206).

In the case where the amount of rotation of φ has not reached 360 degrees or more, the rendering image generating unit 23 returns to step 202 and repeats the processing of steps 202 to 206 regarding the current rotation amounts of φ and θ. In this case, the current rotation amounts of φ and θ represent the rotation amounts of φ and θ set in step 205.

In the case where the rotation amount of φ has reached 360 degrees or more, the rendering image generating unit 23 sets the rotation amount of φ to 0 degrees and increases the rotation amount of θ by 5 degrees (step 207). The increase width, which is 5 degrees, of the rotation amount of θ is merely an example. From the point of view of reducing the amount of calculation, the increase width of the rotation amount of θ may be, for example, 30 degrees, 60 degrees, or the like. Then, the rendering image generating unit 23 determines whether or not the rotation amount of θ has reached 360 degrees or more (step 208).

In the case where the rotation amount of θ has not reached 360 degrees or more, the rendering image generating unit 23 returns to step 202 and repeats the processing of steps 202 to 208 regarding the current rotation amounts of φ and θ. In this case, the current rotation amounts of φ and θ represent the rotation amounts of φ and θ set in step 207.

In the case where the rotation amount of θ has reached 360 degrees or more, the rendering image generating unit 23 sorts the correspondence information by using the first sort key as a feature value and the second sort key as rotation amounts of φ and θ (step 209). At this time, correspondence information with a feature value less than or equal to a reference value may be deleted.

Next, the transmitting unit 24 of the difference display apparatus 10 transmits the rendering image generated by the rendering image generating unit 23 to the terminal apparatus 30.

Figure 16:
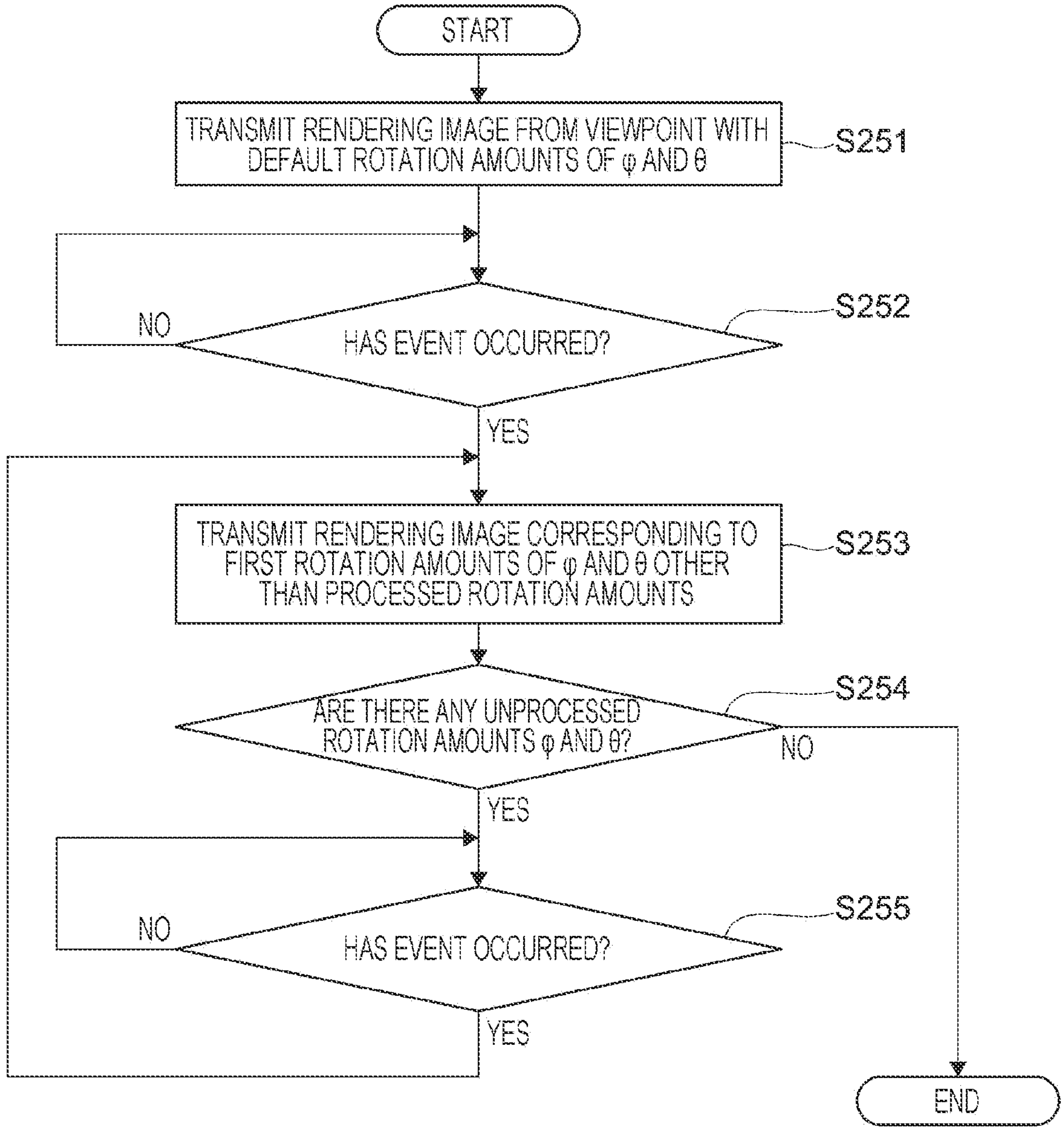
FIG. 16 is a flowchart illustrating an operation example of a transmitting unit of the difference display apparatus according to an exemplary embodiment.

FIG. 16 is a flowchart illustrating an example of an operation of the transmitting unit 24.

As illustrated in FIG. 16, first, the transmitting unit 24 transmits the rendering image obtained by performing two-dimensional rendering of the model viewed from the viewpoint with default rotation amounts of φ and θ to the terminal apparatus 30 (step 251).

Next, the transmitting unit 24 determines whether or not a predetermined event has occurred (step 252). The predetermined event may be an event in which a predetermined time passes. In this case, based on whether or not a time measuring unit, which is not illustrated in drawings, has measured the predetermined time, the transmitting unit 24 may determine whether or not the event has occurred. Alternatively, the predetermined event may be an event in which the user performs a predetermined operation. In this case, based on whether or not the receiving unit 21 has received information indicating that the user has performed the predetermined operation, the transmitting unit 24 may determine whether or not the event has occurred.

In the case where the predetermined event has not occurred, the transmitting unit 24 repeats the processing of step 252.

In the case where the predetermined event has occurred, the transmitting unit 24 transmits a rendering image associated with the first rotation amounts of φ and θ other than the processed rotation amounts φ and θ in the correspondence information sorted in step 209 in FIG. 15 to the terminal apparatus 30 (step 253).

Next, the transmitting unit 24 determines whether or not there are unprocessed rotation amounts of φ and θ in the correspondence information sorted in step 209 in FIG. 15 (step 254).

In the case where there are unprocessed rotation amounts of φ and θ, the transmitting unit 24 determines whether or not the predetermined event has occurred (step 255). The predetermined event and the method for determining whether or not the predetermined event has occurred in this case are the same as those in step 252.

In the case where the predetermined event has not occurred, the transmitting unit 24 repeats the processing of step 255.

In the case where the predetermined event has occurred, the transmitting unit 24 returns to step 253.

In the case where there are no unprocessed rotation amounts of φ and θ in step 254, the transmitting unit 24 ends the process.

[Modifications]

An aspect in which an exemplary embodiment is implemented by the difference display system 1 that includes the difference display apparatus 10 and the terminal apparatus 30 has been described above. However, an exemplary embodiment does not necessarily implemented by the difference display system 1 that includes the difference display apparatus 10 and the terminal apparatus 30. For example, an exemplary embodiment may be implemented by the difference display apparatus 10. In this case, instead of an aspect in which the transmitting unit 24 of the difference display apparatus 10 transmits a rendering image to the terminal apparatus 30 and the rendering image is displayed on the terminal apparatus 30, a display controller of the difference display apparatus 10 displays a rendering image on a display device of the difference display apparatus 10.

[Program]

A process performed by the difference display apparatus 10 according to an exemplary embodiment is provided as, for example, a program such as application software.

In this case, a program implementing an exemplary embodiment is regarded as a program for causing a computer to implement a function for identifying at least one revised part changed between before and after editing of three-dimensional shape data representing a three-dimensional shape, and a function for controlling a specific image that is based on the three-dimensional shape data and is obtained by viewing the three-dimensional shape from a specific viewpoint at which a feature value of the at least one revised part satisfies a predetermined condition to be displayed.

Obviously, a program implementing an exemplary embodiment may be provided not only by communication means but may also be stored in a recording medium such as a compact disc-read only memory (CD-ROM) and provided.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing system comprising:

one or a plurality of processors configured to:

identify at least one revised part changed between before and after editing of three-dimensional shape data representing a three-dimensional shape; and control a specific image that is based on the three-dimensional shape data and is obtained by viewing the three-dimensional shape from a specific viewpoint at which a feature value of the at least one revised part satisfies a predetermined condition to be displayed.

(((2)))

The information processing system according to (((1))), wherein the feature value is an area of the at least one revised part in an image.

(((3)))

The information processing system according to (((2))), wherein the predetermined condition is a condition that the area is displayed to be the largest.

(((4)))

The information processing system according to (((1))), wherein the feature value is a number of the at least one revised part in an image.

(((5)))

The information processing system according to (((4))), wherein the predetermined condition is a condition that the number of the at least one revised part is displayed to be the largest.

(((6)))

The information processing system according to ((1))), wherein the feature value is an area of a specific revised part among a plurality of revised parts in an image.

(((7)))

The information processing system according to (((6))), wherein the specific revised part is a revised part with the largest difference between before and after a change among the plurality of revised parts.

(((8)))

The information processing system according to (((6))) or (((7))), wherein the predetermined condition is a condition that the area is displayed to be the largest.

(((9)))

The information processing system according to (((1))), wherein the feature value is calculated based on a first feature value of a revised part that is able to be seen in an image without a non-revised part in the three-dimensional shape being made transparent among the at least one revised part, a first weight that is a weight on the first feature value, a second feature value of a revised part that is able to be seen in the image by making the non-revised part transparent among the at least one revised part, and a second weight that is a weight on the second feature value and is smaller than the first weight.

(((10)))

The information processing system according to any one of (((1))) to (((9))), wherein the one or the plurality of processors are configured to perform control in such a manner that, after controlling an image obtained by viewing the three-dimensional shape from a predetermined viewpoint to be displayed, when a predetermined event occurs, the specific image is displayed.

(((11)))

The information processing system according to (((10))), wherein the predetermined event is an event in which a predetermined time passes.

(((12)))

The information processing system according to (((10))), wherein the predetermined event is an event in which a user performs a predetermined operation.

(((13)))

The information processing system according to any one of (((1))) to (((9))), wherein the one or the plurality of processors are configured to perform control in such a manner that, after controlling the specific image to be displayed, when a predetermined event occurs, a different image that is obtained by viewing the three-dimensional shape from a different viewpoint at which the feature value satisfies the predetermined condition is displayed.

(((14)))

The information processing system according to (((13))), wherein the predetermined event is an event in which a predetermined time passes.

(((15)))

The information processing system according to (((13))), wherein the predetermined event is an event in which a user performs an operation for selecting a display element representing the different viewpoint from among a plurality of display elements representing a plurality of viewpoints.

(((16)))

The information processing system according to (((13))), wherein the one or the plurality of processors are configured to perform control in such a manner that, after controlling an image obtained by viewing the three-dimensional shape from a viewpoint at which a degree of how much the feature value of the at least one revised part satisfies the predetermined condition is a first degree to be displayed as the specific image, when the predetermined event occurs, an image obtained by viewing the three-dimensional shape from a viewpoint at which the degree of how much the feature value satisfies the predetermined condition is a second degree that is lower than the first degree is displayed.

(((17)))

The information processing system according to (((13))), wherein the one or the plurality of processors are configured to perform control in such a manner that, after controlling an image obtained by viewing the three-dimensional shape from a viewpoint at which a degree of how much a first feature value of the at least one revised part satisfies a first condition that is the predetermined condition corresponding to the first feature value is a specific degree to be displayed as the specific image, when the predetermined event occurs, an image obtained by viewing the three-dimensional shape from a viewpoint at which a degree of how much a second feature value of the at least one revised part satisfies a second condition that is the predetermined condition corresponding to the second feature value is the specific degree is displayed.

(((18)))

The information processing system according to any one of (((1))) to (((9))), wherein the one or the plurality of processors are configured to:

- control images obtained by viewing the three-dimensional shape from a plurality of viewpoints to be sequentially displayed in accordance with an operation by a user; and
- when an image obtained by viewing the three-dimensional shape from the specific viewpoint is displayed, provide a notification indicating that the image obtained by viewing the three-dimensional shape from the specific viewpoint is displayed to the user.

(((19)))

A program for causing a computer to execute:

- a function for identifying at least one revised part changed between before and after editing of three-dimensional shape data representing a three-dimensional shape; and
- a function for controlling a specific image that is based on the three-dimensional shape data and is obtained by viewing the three-dimensional shape from a specific viewpoint at which a feature value of the at least one revised part satisfies a predetermined condition to be displayed.

What is claimed is:

1. An information processing system comprising:

one or a plurality of processors configured to:

- identify at least one revised part changed between before and after editing of three-dimensional shape data representing a three-dimensional shape;
- determine a specific viewpoint from which the three-dimensional shape is to be viewed so that, a calculated feature value of the at least one revised part when the three-dimensional shape is viewed from the specific viewpoint is higher than the feature value of the at least one revised part when the three-dimensional shape is viewed from another viewpoint, the feature value being a numerical value that is calculated by the one or the plurality of processors;
- generate a specific image that is a two-dimensional image obtained by viewing the three-dimensional shape from the specific viewpoint; and
- cause display of the specific image on a user terminal.

2. The information processing system according to claim 1, wherein the feature value is a size of an area of the at least one revised part in an image.

3. The information processing system according to claim 2, wherein the specific view point is determined so that the size of the area of the at least one revised part displayed in an image is the largest.

4. The information processing system according to claim 1, wherein the feature value is a number of the at least one revised part in an image.

5. The information processing system according to claim 4, wherein the specific view point is determined so that the number of the at least one revised part displayed in an image is the largest.

6. The information processing system according to claim 1, wherein the feature value is a size of an area of a specific revised part among a plurality of revised parts in an image.

7. The information processing system according to claim 6, wherein the specific revised part is a revised part with the largest difference between before and after a change among the plurality of revised parts.

8. The information processing system according to claim 6, wherein the specific view point is determined so that the size of the area of the specific revised part displayed in an image is the largest.

9. The information processing system according to claim 1, wherein the feature value is calculated based on a first feature value of a revised part that is able to be seen in an image without a non-revised part in the three-dimensional shape being made transparent among the at least one revised part, a first weight that is a weight on the first feature value, a second feature value of a revised part that is able to be seen in the image by making the non-revised part transparent among the at least one revised part, and a second weight that is a weight on the second feature value and is smaller than the first weight.

10. The information processing system according to claim 1, wherein the one or the plurality of processors are configured to perform control in such a manner that, after controlling an image obtained by viewing the three-dimensional shape from a predetermined viewpoint to be displayed, when a predetermined event occurs, the specific image is displayed.

11. The information processing system according to claim 10, wherein the predetermined event is an event in which a predetermined time passes.

12. The information processing system according to claim 10, wherein the predetermined event is an event in which a user performs a predetermined operation.

13. The information processing system according to claim 1, wherein the one or the plurality of processors are configured to perform control in such a manner that, after controlling the specific image to be displayed, when a predetermined event occurs, a different image that is obtained by viewing the three-dimensional shape from a different viewpoint at which the feature value satisfies a predetermined condition, is displayed.

14. The information processing system according to claim 13, wherein the predetermined event is an event in which a predetermined time passes.

15. The information processing system according to claim 13, wherein the predetermined event is an event in which a user performs an operation for selecting a display element representing the different viewpoint from among a plurality of display elements representing a plurality of viewpoints.

16. The information processing system according to claim 13, wherein the one or the plurality of processors are configured to perform control in such a manner that, after controlling an image obtained by viewing the three-dimensional shape from a viewpoint at which a degree of how much the feature value of the at least one revised part satisfies a predetermined condition is a first degree to be displayed as the specific image, when the predetermined event occurs, an image obtained by viewing the three-dimensional shape from a viewpoint at which the degree of how much the feature value satisfies the predetermined condition is a second degree that is lower than the first degree, is displayed.

17. The information processing system according to claim 13, wherein the one or the plurality of processors are configured to perform control in such a manner that, after controlling an image obtained by viewing the three-dimensional shape from a viewpoint at which a degree of how much a first feature value of the at least one revised part satisfies a first condition is a specific degree to be displayed as the specific image, when the predetermined event occurs, an image obtained by viewing the three-dimensional shape from a viewpoint at which a degree of how much a second feature value of the at least one revised part satisfies a second condition is the specific degree, is displayed.

18. The information processing system according to claim 1, wherein the one or the plurality of processors are configured to:

control images obtained by viewing the three-dimensional shape from a plurality of viewpoints to be sequentially displayed in accordance with an operation by a user; and when an image obtained by viewing the three-dimensional shape from the specific viewpoint is displayed, provide a notification indicating that the image obtained by viewing the three-dimensional shape from the specific viewpoint is displayed to the user.

19. An information processing method comprising:

identifying at least one revised part changed between before and after editing of three-dimensional shape data representing a three-dimensional shape;

determining a specific viewpoint from which the three-dimensional shape is to be viewed so that, a calculated feature value of the at least one revised part when the three-dimensional shape is viewed from the specific viewpoint is higher than the feature value of the at least one revised part when the three-dimensional shape is viewed from another viewpoint, the feature value being a numerical value that is calculated;

generating a specific image that is a two-dimensional image obtained by viewing the three-dimensional shape from the specific viewpoint; and causing display of the specific image on a user terminal.

20. A non-transitory computer readable medium storing a program causing a computer to execute a process for information processing, the process comprising:

identifying at least one revised part changed between before and after editing of three-dimensional shape data representing a three-dimensional shape;

determining a specific viewpoint from which the three-dimensional shape is to be viewed so that, a calculated feature value of the at least one revised part when the three-dimensional shape is viewed from the specific viewpoint is higher than the feature value of the at least one revised part when the three-dimensional shape is viewed from another viewpoint, the feature value being a numerical value that is calculated;

generating a specific image that is a two-dimensional image obtained by viewing the three-dimensional shape from the specific viewpoint; and causing display of the specific image on a user terminal.

* * * * *